United States Patent
Mamarelis et al.

(10) Patent No.: US 11,707,990 B2
(45) Date of Patent: Jul. 25, 2023

(54) METHOD AND SYSTEM TO CONTROL AT LEAST TWO ELECTRIC MOTORS DRIVING A VEHICLE

(71) Applicant: TEXA S.P.A., Monastier di Treviso (IT)

(72) Inventors: Emilio Mamarelis, Monastier di Treviso (IT); Manfredi Ciappa, Monastier di Treviso (IT); Valerio Giorgetta, Monastier di Treviso (IT); Loris Lambertini, Monastier di Treviso (IT)

(73) Assignee: TEXA S.P.A., Monastier di Treviso (IT)

( * ) Notice: Subject to any disclaimer, the term of this patent is extended or adjusted under 35 U.S.C. 154(b) by 327 days.

(21) Appl. No.: 17/066,637

(22) Filed: Oct. 9, 2020

(65) Prior Publication Data
US 2021/0146786 A1 May 20, 2021

(30) Foreign Application Priority Data
Oct. 10, 2019 (IT) .......................... 102019000018362

(51) Int. Cl.
*B60L 15/20* (2006.01)
*B60W 50/02* (2012.01)
(Continued)

(52) U.S. Cl.
CPC ................ *B60L 15/20* (2013.01); *B60K 1/02* (2013.01); *B60W 50/02* (2013.01); *H02P 5/50* (2013.01);
(Continued)

(58) Field of Classification Search
CPC .... B60L 3/0084; B60L 3/0092; B60L 15/007; B60L 15/08; B60L 15/20; B60L 15/32;
(Continued)

(56) References Cited

U.S. PATENT DOCUMENTS

| 5,001,641 A | * | 3/1991 | Makino | ................... B60T 8/885 |
| | | | | 303/122.07 |
| 9,428,159 B2 | | 8/2016 | Heise et al. | |
| (Continued) | | | | |

FOREIGN PATENT DOCUMENTS

| CN | 108146250 A * | 6/2018 | ............ B60L 3/0084 |
| WO | WO-2013029384 A1 * | 3/2013 | ................ H02P 6/08 |

(Continued)

OTHER PUBLICATIONS

International Standard, ISO 26262-8, "Road vehicles—Functional safety—Part 8: Supporting processes", First Edition Nov. 15, 2011, 58 pages (Year: 2011).*

*Primary Examiner* — David A Testardi
(74) *Attorney, Agent, or Firm* — Leason Ellis LLP

(57) ABSTRACT

A control method and system to control a pair of electric motors driving a vehicle. The steps provided for are: determining, in a control cycle N and by means of a first processing core, for a first electric motor, a first electric current target based on a first torque or speed target; determining, in the control cycle N and by means of a second processing core, for a second electric motor, a second electric current target based on a second torque or speed target; controlling, in the control cycle N and by means of the first processing core, a first electronic power converter connected to the first electric motor so as to pursue the first electric current target; and controlling, in the control cycle N and by means of the second processing core, a second electronic power converter connected to the second electric motor so as to pursue the second electric current target.

15 Claims, 2 Drawing Sheets

(51) Int. Cl.
  *B60K 1/02* (2006.01)
  *H02P 5/50* (2016.01)

(52) U.S. Cl.
  CPC ..... *B60L 2210/30* (2013.01); *B60L 2240/429* (2013.01); *B60W 2050/021* (2013.01)

(58) Field of Classification Search
  CPC ............. B60L 2220/44; B60L 2220/46; B60L 2220/42; B60K 1/02; B60W 50/02; B60W 2050/021; B60W 2050/0292; H02P 5/74
  See application file for complete search history.

(56) References Cited

U.S. PATENT DOCUMENTS

| | | | |
|---|---|---|---|
| 10,126,800 B2 | 11/2018 | Moteur | |
| 10,585,449 B1* | 3/2020 | Ringe | H03L 7/0991 |
| 10,988,134 B2* | 4/2021 | Gaviani | B60W 20/20 |
| 2004/0160201 A1* | 8/2004 | Rahman | H02P 23/06 |
| | | | 318/41 |
| 2006/0212135 A1* | 9/2006 | Degoul | G05B 9/03 |
| | | | 700/20 |
| 2009/0201650 A1* | 8/2009 | Hauser | H02P 5/74 |
| | | | 361/736 |
| 2010/0222953 A1* | 9/2010 | Tang | B60W 10/08 |
| | | | 701/22 |
| 2010/0280721 A1* | 11/2010 | Marcigliano | F16D 48/06 |
| | | | 701/54 |
| 2011/0084642 A1* | 4/2011 | Ams | H02H 7/0844 |
| | | | 318/490 |
| 2011/0084643 A1* | 4/2011 | Ams | H02P 29/02 |
| | | | 318/489 |
| 2013/0268798 A1* | 10/2013 | Schade | G06F 11/1487 |
| | | | 714/38.1 |
| 2013/0282249 A1* | 10/2013 | Heise | B60T 13/746 |
| | | | 701/70 |
| 2014/0229064 A1* | 8/2014 | Arnold | B60L 3/0092 |
| | | | 701/41 |
| 2015/0057908 A1* | 2/2015 | Carbonaro | B60W 50/02 |
| | | | 701/102 |
| 2015/0175010 A1* | 6/2015 | Tang | H02H 7/08 |
| | | | 701/22 |
| 2015/0231971 A1* | 8/2015 | Taira | B60K 28/04 |
| | | | 701/22 |
| 2016/0006388 A1* | 1/2016 | Masuda | H02P 27/08 |
| | | | 318/51 |
| 2016/0062331 A1* | 3/2016 | Von Wendorff | G05B 19/042 |
| | | | 702/66 |
| 2016/0077566 A1* | 3/2016 | Caubert | B60L 15/20 |
| | | | 713/340 |
| 2016/0299839 A1* | 10/2016 | Biewer | G06F 15/17325 |
| 2017/0021839 A1* | 1/2017 | Satyavolu | H04L 67/12 |
| 2017/0120889 A1* | 5/2017 | Choi | B60W 10/26 |
| 2017/0131698 A1* | 5/2017 | Hatakeyama | H02P 29/032 |
| 2017/0361852 A1* | 12/2017 | Topp | G06F 11/26 |
| 2018/0105183 A1* | 4/2018 | Kollmer | G06F 11/0739 |
| 2018/0154906 A1* | 6/2018 | Dudar | B60W 50/0225 |
| 2018/0186230 A1* | 7/2018 | Fukuda | B60W 20/40 |
| 2018/0281597 A1* | 10/2018 | Herb | B60L 3/0084 |
| 2018/0349259 A1* | 12/2018 | Mariani | G06F 11/008 |
| 2019/0004582 A1* | 1/2019 | Rotem | G06F 1/324 |
| 2019/0100105 A1* | 4/2019 | Liu | B60L 15/20 |
| 2019/0370130 A1* | 12/2019 | Meriac | G06F 1/12 |
| 2019/0382045 A1* | 12/2019 | Sachs | G07C 5/085 |
| 2020/0148218 A1* | 5/2020 | Huang | B60W 60/00186 |
| 2020/0231046 A1* | 7/2020 | Taniguchi | H02P 21/10 |
| 2021/0226573 A1* | 7/2021 | George | B60W 50/023 |
| 2022/0055636 A1* | 2/2022 | Kokrehel | G05B 19/0421 |
| 2022/0242247 A1* | 8/2022 | Woll | B60L 3/003 |

FOREIGN PATENT DOCUMENTS

| | | | | |
|---|---|---|---|---|
| WO | WO-2016031696 A1 * | 3/2016 | | B60K 7/00 |
| WO | WO-2016076142 A1 * | 5/2016 | | B60K 1/02 |

* cited by examiner

METHOD AND SYSTEM TO CONTROL AT LEAST TWO ELECTRIC MOTORS DRIVING A VEHICLE

CROSS-REFERENCE TO RELATED APPLICATIONS

This patent application claims priority from Italian Patent Application No. 102019000018362 filed on Oct. 10, 2019, the entire disclosure of which is incorporated herein by reference.

TECHNICAL FIELD

The present invention relates to a method and to a system to control at least two electric motors driving a vehicle.

In particular, the present invention relates to the advanced interactive monitoring and to the synchronization strategy of electric motors driving a vehicle in compliance with the functional safety strategies.

The present invention is advantageously implemented in a car having at least one electric axle provided with two independent electric motors, to which the following discussion will explicitly refer without thereby losing its generality.

PRIOR ART

An electric axle is a driving member which, exploiting the motion generated by at least one electric motor, is capable of transmitting the motion to both wheels belonging to the axle. In a car having four wheels, there are obviously two axles: a front axle and a rear axle.

An electric car has one electric axle (in the case of an exclusively front-wheel or rear-wheel drive) or has two electric axles (in the case of four-wheel drive). A hybrid car, instead, can have a (front or rear) electric axle and a (front or rear) thermal axle.

In the simplest version, an electric axle has a single electric motor which transmits the motion to both wheels through a differential (indispensable for driving along curves). It has recently been proposed to manufacture an electric axle with two electric motors which are completely independent from one another and are connected directly to the respective wheels (possibly with the interposition of a speed multiplier such as an epicyclic gear train) so as to be able to carry out the driving dynamics control (also known as torque vectoring), i.e. to be able to vary the torque applied to each wheel in an independent manner.

However, the control of an electric axle provided with two electric motors is particularly delicate since a control error can lead to apply torques to the two wheels of the electric axle considerably different from the optimal torques, consequently making the car unstable (and thus running the risk of causing an accident), in particular when the electric axle is the front axle.

The current solutions in the state of the art are formed by control systems wherein the control functionality is distributed over more than one platform (for example, control units or microprocessor) and each platform is equipped with a plurality of controllers which implement separate control functionalities (implemented as QM) and monitoring functions with assigned safety requirements; this control system architecture involves the implementation of an interactive monitoring of the different platforms with a high level of complexity both in terms of implementation and in terms of test strategies.

For example, the patent application US2004160201A1 describes a control system for controlling two electric motors driving a vehicle; the control system comprising: a first processing core which is configured to control a first electronic power converter connected to the first electric motor; a second processing core which is configured to control a second electronic power converter connected to the second electric motor; and a third processing core which is configured to transmit, by means of a BUS line, a torque or speed target to the first and to the second processing core. In particular, the first processing core operates as master and provides the second processing core, which operates as slave, with a synchronization signal which allows the motions of the two electric motors to be kept synchronized.

The control system described in the patent application US2004160201A1 is effective (i.e. allows a precise control of the motion of the two electric motors), but is also rather slow (i.e. has high latency) and is thus not suitable for performing functions (such as, for example, the driving dynamics control, also known as torque vectoring) which require a very rapid response, i.e. require to rapidly modify the torque generated by the electric motors. Moreover, the slow response of the control system makes the intervention in the event of emergency situations (for example, in the event of loss of a wheel drive or in the event of loss of vehicle stability) less prompt and thus less effective.

DESCRIPTION OF THE INVENTION

The objective of the present invention is to provide a method and a system for controlling at least two electric motors driving a vehicle, said method and control system being capable of responding very rapidly to the vehicle control requests, being capable of ensuring the safety of the vehicle, and at the same time being easy and cost-effective to implement.

In particular, the control method and system must ensure the advanced interactive monitoring and the synchronization strategy of electric motors compliant with the functional safety strategies according to the standard ISO26262 ("Functional Safety for Road Vehicles standard") or according to other equivalent ISO standards concerning other fields of application.

According to the present invention, a method and a system for controlling at least two electric motors driving a vehicle are provided according to what claimed in the appended claims.

The claims describe preferred embodiments of the present invention constituting an integral part of the present description.

BRIEF DESCRIPTION OF THE DRAWINGS

The present invention will now be described with reference to the attached drawings, which illustrate a non-limiting embodiment example thereof, wherein.

PREFERRED EMBODIMENTS OF THE INVENTION

Figure 1:
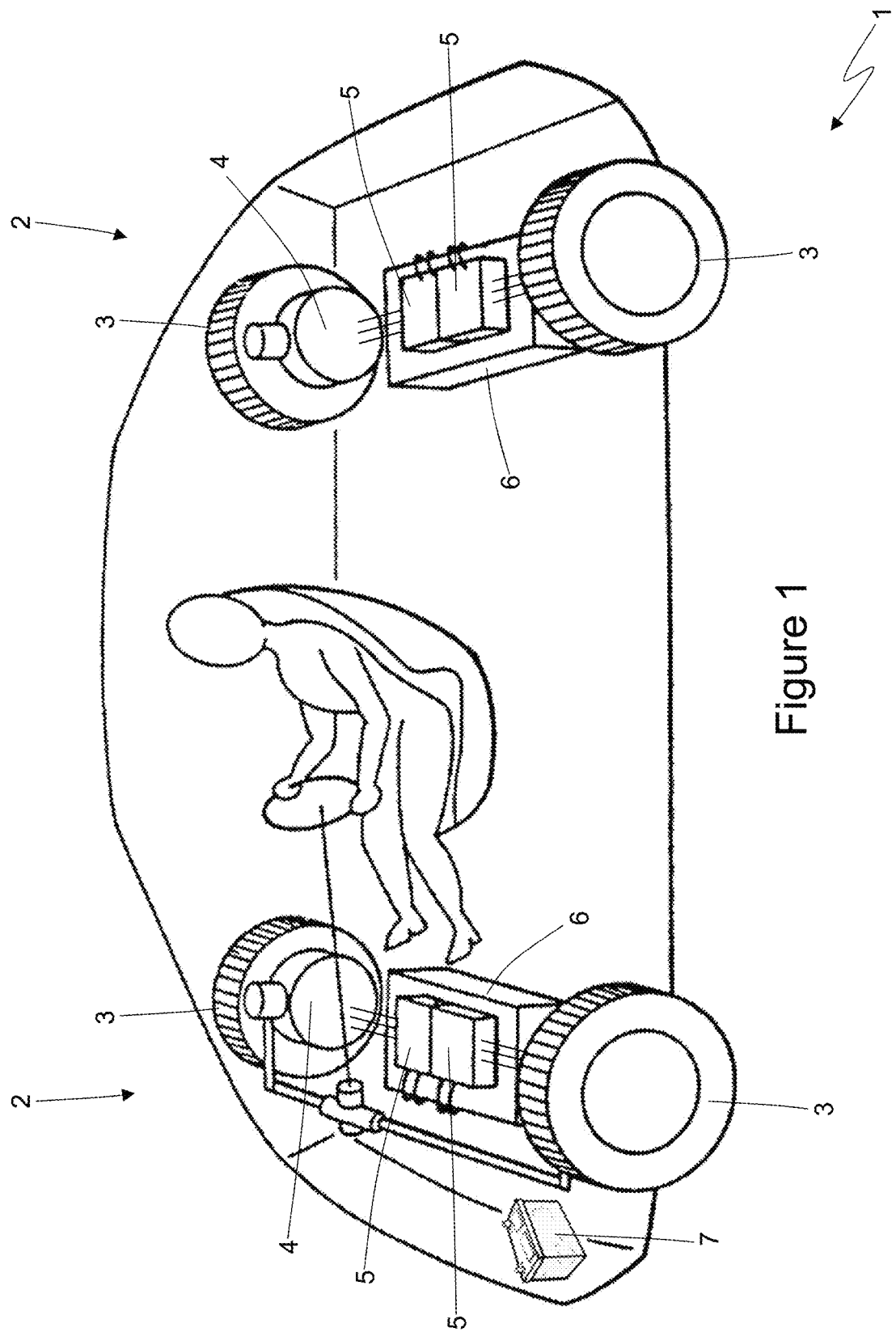
FIG. 1 is a schematic view of a car with electric propulsion and provided with two electric axles provided with the control system of the present invention.

In FIG. 1, reference numeral 1 indicates as a whole a vehicle with electric propulsion provided with a front electric axle 2 and a rear electric axle 2.

Each electric axle 2 comprises two driving wheels 3 (respectively a right driving wheel 3 and a left driving wheel 3) and two electric motors 4 which are mechanically entirely independent from one another (i.e. do not have any type of mechanical connection with one another) and directly transmit the motion to the corresponding driving wheels 3. In particular, each driving wheel 3 is angularly integral with an axle shaft (not illustrated), which is connected to a shaft of the corresponding electric motor 4 (possibly with the interposition of a speed multiplier such as an epicyclic gear train).

According to a different embodiment not illustrated, the vehicle 1 comprises one single electric axle 2 arranged in front position or in rear position; in this embodiment, the vehicle 1 could comprise an internal combustion engine which transmits the motion to the driving wheels 3 not belonging to the single electric axle 2.

In the embodiment illustrated in FIG. 1, the electric motors 4 are arranged laterally near the corresponding driving wheels 3 (the axle shafts are thus rather short), while, according to other embodiments not illustrated, the electric motors 4 are arranged in a more central position (the axle shafts are thus longer). According to a preferred, but not binding embodiment, the axle shafts are dimensioned so as to break in a controlled manner in the event of seizure of the electric motors 4 so as to prevent greater damage to the electric motors 4 and, at the same time, to prevent blocking the driving wheels 2 for too long.

Each electric motor 4 is controlled by an AC/DC electronic power converter 5 (i.e. an inverter) which can make the electric motor 4 function as motor absorbing electric energy and generating a mechanical torque or as generator absorbing mechanical energy and generating electric energy. The two electronic power converters 5 of a same electric axle 2 are connected to a same electric energy storage device 6, which is provided with chemical batteries and has a high nominal voltage (in the order of a hundred volts) and a high electric energy storing capacity. In other words, each electronic power converter 5 is bidirectional and comprises a side in direct current connected to the storage device 6 and a side in three-phase alternating current which is connected to the corresponding electric motor 4.

The vehicle 1 is also provided with a low-voltage and low-power electrical system which has a nominal voltage of 12 volts, is designed to supply the control systems and the auxiliary services, is provided with its own storage device 7 (i.e. with its own chemical battery), and is adapted to receive electric energy from the storage devices 6 through a DC-DC electronic power converter.

Figure 2:
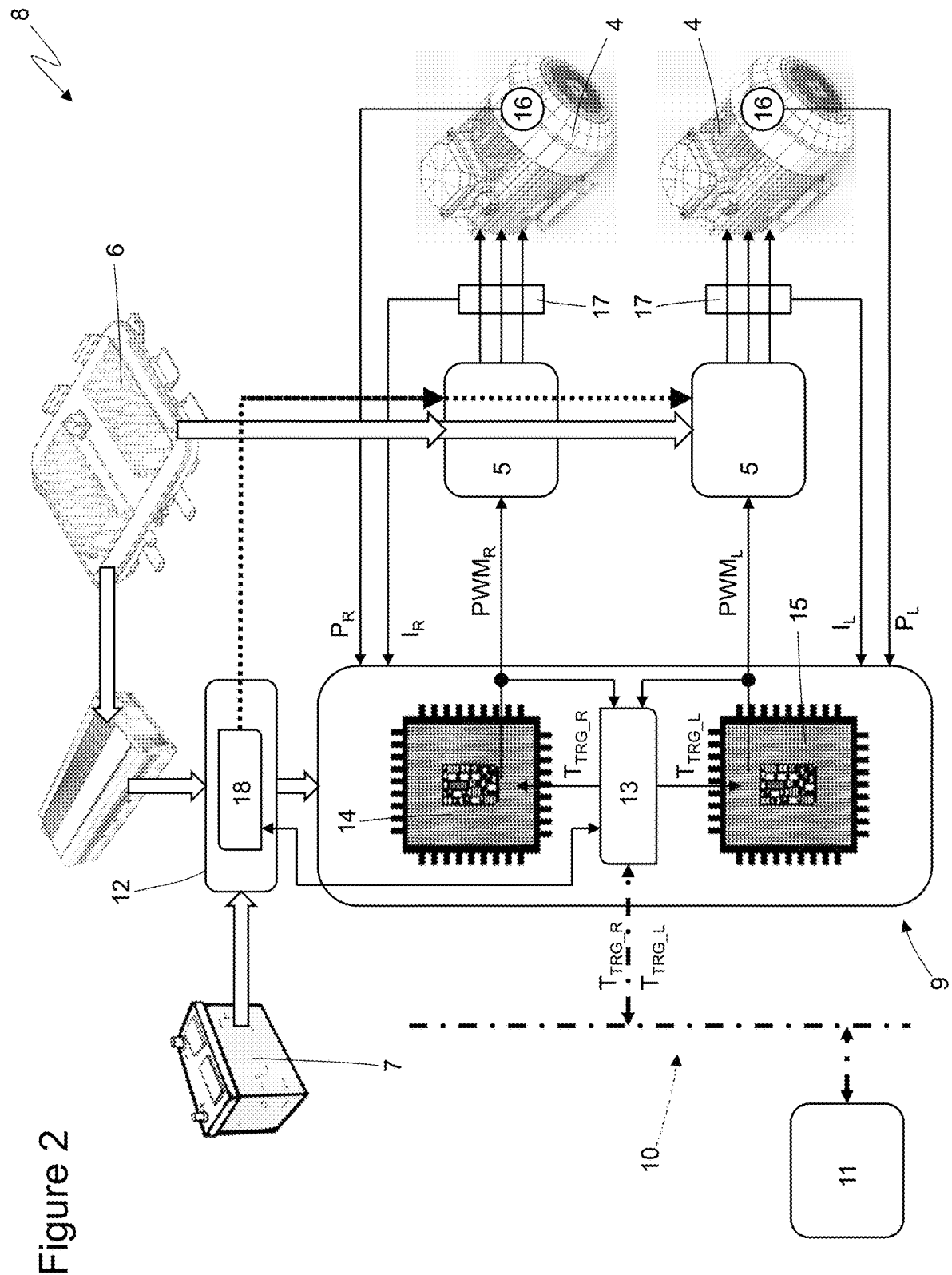
FIG. 2 is a schematic view of the control system for controlling a pair of electric driving motors of a same axle.

As illustrated in FIG. 2, each electric axle 2 comprises a control system 8 which controls the two electric motors 4 by means of the corresponding electronic power converters 5.

The control system 8 of each electric axle 2 comprises a multi-core microprocessor 9 (i.e. comprising a plurality of "processing cores"). In the embodiment illustrated in the attached figures, the multi-core microprocessor 9 is connected to a BUS network 10 of the vehicle 1 in order to communicate with a vehicle control unit 11 (also called VCU, acronym for Vehicle Control Unit); according to a different embodiment not illustrated, the vehicle control unit 11 is not provided. The multi-core microprocessor 9 directly controls the two electronic power converters 5 providing the electronic power converters 5 with respective $PMW_R$ and $PWM_L$ control signals of PWM type (i.e. PWM acronym for Pulse Width Modulation); obviously, each $PMW_R$ or $PWM_L$ control signal of PWM type has three different channels for controlling the three phases in alternating current in an independent manner.

The multi-core microprocessor 9 has a nominal supply voltage of 5 volts and is provided with a voltage regulator 12 which receives, at the input, a direct voltage of 12 volts and, at the output (i.e. toward the multi-core microprocessor 9), provides a very stable direct voltage of 5 volts; the voltage regulator 12 is supplied directly by the storage device 7 of the low-voltage electrical system and is supplied indirectly by the storage device 6 of the high-voltage electrical system by means of the interposition of a micro DC-DC electronic power converter. This way, the multi-core microprocessor 9 has two alternative power supplies and redundant with one another in order to ensure the maximum continuity of service. According to an alternative embodiment not illustrated, the multi-core microprocessor 9 (i.e. the voltage regulator 12 of the multi-core microprocessor 9) is supplied solely by the storage device 7 of the low-voltage electrical system or solely by the storage device 6 of the high-voltage electrical system.

The multi-core microprocessor 9 comprises a processing core 13 (i.e. one core) which communicates directly with the vehicle control unit 11 through the BUS network 10 of the road vehicle 1. The multi-core microprocessor 9 further comprises two processing cores 14 and 15 (i.e. two cores) which communicate with the processing core 13 and directly control the two electronic power converters 5 providing the electronic power converters 5 with the respective $PMW_R$ and $PWM_L$ control signals of PWM type. Coupled to each electric motor 4 is a position/speed sensor 16 (for example, a resolver or an angle encoder) which detects the position $P_R$ or $P_L$ of the shaft of the corresponding electric motor 4 (and/or the relative speed of rotation) so that it is then used by the multi-core microprocessor 9. Each electronic power converter 5 comprises a current sensor 17 which measures the intensity of the electric current IR or IL (in all three phases) which flows toward the corresponding electric motor 4 and transmits it in real time to the multi-core microprocessor 9.

In use, the master processing core 13 cyclically checks for the presence of operation (understood as capacity to carry out its own task) in the two slave processing cores 14 and 15 (i.e. the correct operation of the two slave processing cores 14 and 15); in other words, the master processing core 13 is configured to carry out a monitoring of the presence of operation in the two slave processing cores 14 and 15 in order to check if the two slave processing cores 14 and 15 are actually operating correctly. It is important to emphasize that the master processing core 13, when cyclically checking for the presence of operation in the two slave processing cores 14 and 15, does not investigate the state of the outputs of the slave processing cores 14 and 15 (i.e. does not investigate how the slave processing cores 14 and 15 are controlling the electronic power converters 5), but only controls that the slave processing cores 14 and 15 are capable of operating (i.e. have not crashed and are not in other analogous error conditions).

Externally to the multi-core microprocessor 9 (i.e. independently of the multi-core microprocessor 9), the control system 8 comprises a surveillance device 18 inside which a surveillance entity is also implemented (operating as watchdog) which cyclically checks for the presence of operation (understood as capacity to carry out its own task) of the multi-core microprocessor 9 (and in particular of the master processing core 13 of the multi-core microprocessor 9); in the event of some malfunctions of the multi-core microprocessor 9, the surveillance device 18, also equipped with dedicated hardware, is capable of intervening directly upon the electronic power converters 5 (in a completely independent manner from the multi-core microprocessor 9) in order to control the electronic power converters 5 so as to control both electric motors 4 leaving them in freewheeling rotation (i.e. placing the electric motors 4 potentially out of control in the condition of greater safety for the road vehicle 1).

In other words, the surveillance entity present inside the surveillance device 18 cyclically checks that the multi-core microprocessor 9 is operating correctly and, in the event of problems in the multi-core microprocessor 9, activates emergency recovery procedures and attainment of the safe state which operate in a manner completely autonomous from the multi-core microprocessor 9 (which is no longer considered reliable) and typically tend to turn off both electric motors 4 (i.e. operating as fail-safe systems). According to other embodiments, the emergency recovery procedures might not turn off both electric motors 4 (i.e. place the electric motors 4 in freewheeling), but the electric motors 4 could continue to operate with a more or less reduced (degraded) performance with respect to the nominal performance (in this manner, the vehicle 1 is not brought to a standstill but only "slowed down"); i.e. the emergency recovery procedures could integrate fail-operational or fault-tolerant systems which allow continuing to operate the electric motors 4 with a more or less reduced (degraded) performance with respect to the nominal performance.

According to a preferred embodiment, the surveillance device 18 is integrated in the electronics for controlling the voltage regulator 12, i.e. is part of the electronics for controlling the voltage regulator 12; this way, it is possible to reduce the overall costs of the control system 8, since a same component (the voltage regulator 12) is used for two different functions.

In use, the integrated surveillance entity inside the surveillance device 18 cyclically makes requests to the multi-core microprocessor 9 and checks that the multi-core microprocessor 9 responds to these requests correctly and in the set time; such requests are completely independent of the control logic for controlling the electric motors 4, i.e. they do not involve in any way quantities relating to the control of the electric motors 4, and have the sole function of checking that the multi-core microprocessor 9 is operating correctly. For example, the requests made by the surveillance entity integrated inside the surveillance device 18 could be the execution of more or less complex mathematical operations (functional watchdog); or (additionally or alternatively) the requests made by the surveillance entity integrated inside the surveillance device 18 could be the closing of a time window initiated by the surveillance entity integrated inside the surveillance device 18 (window watchdog).

In other words, the master processing core 13 cyclically checks for the presence of operation in the two slave processing cores 14 and 15 (only controlling that the slave processing cores 14 and 15 are capable of operating), while simultaneously the surveillance entity integrated in the surveillance device 18 cyclically checks for the presence of operation in the master processing core 13 (only controlling that the master processing core 13 is capable of operating).

The multi-core microprocessor 9 uses a single clock signal which is thus common to all the processing cores 13-15 which are part of the multi-core microprocessor 9; consequently, the processing cores 13-15 always operate in synchrony executing the various tasks at the same time. In other words, the clock signal is a periodic signal, generally a square wave, which, being unique to the multi-core microprocessor 9, carried out a perfect operational synchronization of the three processing cores 13-15. In use, the multi-core microprocessor 9 (and thus the processing cores 13-15 which are part of the multi-core microprocessor 9) operates according to a succession of control cycles, each having a same duration in the order of milliseconds; for example, each control cycle has a duration of 1-5 milliseconds.

In a control cycle N, the processing core 13 receives from the vehicle control unit 11 (and through the BUS network 10) a torque and/or speed target $T_{TRG\_R}$ for the right electric motor 4 and a torque and/or speed target $T_{TRG\_L}$ for the left electric motor 4. The processing core 13, which operates as master, transmits at the same instant the torque and/or speed targets $T_{TRG\_R}$ and $T_{TRG\_L}$ to the respective processing cores 14 and 15 operating as slaves. The use of a main (master) control entity formed by the processing core 13 ensures that the torque and/or speed targets $T_{TRG\_R}$ and $T_{TRG\_L}$ acquired from the BUS network 10 are transmitted equally and simultaneously to each slave entity dedicated to the control function formed by the processing core 14 or 15 (this architectural concept reduces the latency).

In the control cycle N and by means of the processing core 14, an electric current target $I_{TRG\_R}$ is determined for the right electric motor 4 based on the torque and/or speed target $T_{TRG\_R}$; analogously, in the control cycle N and by means of the processing core 15, an electric current target $I_{TRG\_L}$ is determined for the left electric motor 4 based on the torque and/or speed target $T_{TRG\_L}$.

In the control cycle N and by means of the processing core 14, the electronic power converter 5 connected to the right electric motor 4 is controlled so as to pursue the electric current target $I_{TRG\_R}$; analogously, in the control cycle N and by means of the processing core 15, the electronic power converter 5 connected to the left electric motor 4 is controlled so as to pursue the electric current target $I_{TRG\_L}$.

The control algorithms for controlling the two electronic power converters 5 (i.e. the control algorithms for controlling the two electric motors 4 powered directly by the two electronic power converters 5) implemented in the processing cores 14 and 15 are designed to implement a robust control. The robust control is an automatic control strategy of dynamic systems, the objective of which is the control of the system involved also when not having a complete knowledge thereof. The classic automatic control techniques, in fact, take into consideration a dynamics system known in a complete and accurate manner, whether it is described in a state form or by its transfer function, and on this basis generate an ad hoc controller for that system; in practice, though, this is not possible: the model taken into consideration is always an approximation, more or less valid, of the real system to be controlled; for this reason, robustness of the controller refers to its ability to achieve asymptotic stability in spite of the uncertainty concerning the real system. The robust control differs from the adaptive control in that it is static; in fact, the behaviour of the controller does not change depending on the situations, but merely takes into consideration a certain margin of uncertainty regarding the system. In particular, the robustness of the control algorithms for controlling the two electronic power converters 5 with respect to the possible uncertainties relating to the real system is validated by means of special models so as to have a design addressed to the functional safety from the very beginning.

According to a preferred embodiment, the control algorithms for controlling the two electronic power converters 5 are designed to implement a robust control in accordance with the requirements of the standard ISO26262 ("Functional Safety for Road Vehicles standard"), i.e. to satisfy all the requirements of the standard ISO26262.

The synchrony in the control of the two electric motors 4 is ensured in that the same computation task is carried out simultaneously by two twin processing cores 14 and 15 (synchronized with one another by a same clock signal which is unique to the multi-core microprocessor 9), which are both controlled as slaves by another processing core 13 operating as master and thus dictating the control times.

This architectural solution based on the concept of master-slave control reduces the latencies and possible malfunctions caused by the exchange of data. Moreover, the implementation of the control function for controlling the electric motors 4 in accordance with the requirements of the standard ISO26262 and ensuring the compliance with the safety goal and the relative given ASIL ("Automotive Safety Integrity Level", i.e. the risk classification defined by the standard ISO26262), allows reducing the complexity of the interactive monitoring strategy, which thus comes down to a "mere synchronization". Consequently, the interactive monitoring operated by the processing core 13 (as described in greater detail in the following) comes down to the prevention of errors in the timing of acquisition and implementation of the current values, assuming that quantity errors (for example, absence of functionality or functionality out of validity range) and variation errors (for example intermittency, incorrect functionality within a permissible range) are covered by suitable safety mechanisms and the coverage is demonstrated through dedicated analysis (for example, the so-called Software Failure Mode and Effects Analysis—SFMEA).

Therefore, the focus of the implementation is narrowed down to interactively ensuring and monitoring, the operating mode of the two processing cores 14 and 15 being equal, the timing of acquisition of the processing cores 14 and 15 which will then be transformed into current values to be transmitted to the electronic power converters 5 of the electric motors 4, and interactively ensuring and monitoring the timing of transmission of the outputs from the processing cores 14 and 15. Such timings must comply with specific time thresholds defined as safe at vehicle level. In the event of malfunction (due to a sporadic hardware fault or a software failure) which can lead to the violation of a safety goal, also the safe state has to be implemented in a synchronous manner. The use of a single platform which implements the above-mentioned principles intrinsically ensures the implementation of the safe state in a synchronous manner, thus preventing potential destabilizations of the vehicle and the loss of control.

At each control cycle, the processing core 13 checks that the two processing cores 14 and 15 acquire (from the processing core 13) the respective torque and/or speed targets $T_{TRG\_R}$ and $T_{TRG\_L}$ in a synchronized manner, and activates an emergency recovery procedure for the attainment of the safe state if the two processing cores 14 and 15 do not acquire the respective torque and/or speed targets $T_{TRG\_R}$ and $T_{TRG\_L}$ in a synchronized manner. According to a preferred embodiment, this checking of synchrony is carried out by checking the following equation:

$$|t1_{acq\_N} - t2_{acq\_N}| < TH_1 \quad [1]$$

$t1_{acq\_N}$ time instant (measured by means of the Global System Timer) in which the processing core 14 acquires its own torque and/or speed target $T_{TRG\_R}$ during the control cycle N;

$t2_{acq\_N}$ time instant (measured by means of the Global System Timer) in which the processing core 15 acquires its own torque and/or speed target $T_{TRG\_L}$ during the control cycle N;

$TH_1$ threshold value defined as safe for the control of the vehicle 1.

Obviously, the two processing cores 14 and 15 acquire (from the processing core 13) the respective torque and/or speed targets $T_{TRG\_R}$ and $T_{TRG\_L}$ in a synchronized manner if the difference between the two time instants $t1_{acq\_N}$ and $t2_{acq\_N}$ is, in absolute value, lower than the threshold value $TH_1$ defined at vehicle level as safe.

According to a preferred embodiment, at each control cycle, the processing core 13 checks that the two processing cores 14 and 15 control the respective electronic power converters 5 in a synchronized manner and activates an emergency recovery procedure for the attainment of the safe state if the two processing cores 14 and 15 do not control the respective electronic power converters 5 in a synchronized manner. According to a preferred embodiment, this checking of synchrony is carried out by checking the following equation:

$$|t1_{out\_N} - t2_{out\_N}| < TH_2 \quad [2]$$

$t1_{out\_N}$ time instant (measured by means of the Global System Timer) in which the processing core 14 controls its own electronic power converter 5 during the control cycle N;

$t2_{out\_N}$ time instant (measured by means of the Global System Timer) in which the processing core 15 controls its own electronic power converter 5 during the control cycle N;

$TH_2$ threshold value defined as safe for the control of the vehicle 1.

Obviously, the two processing cores 14 and 15 control the respective electronic power converters 5 in a synchronized manner if the difference between the two time instants $t1_{out\_N}$ and $t2_{out\_N}$ is, in absolute value, lower than the threshold value $TH_2$ defined at vehicle level as safe.

As stated in the foregoing, each processing core 14 or 15 controls the respective electronic power converter 5 by sending to the electronic power converter 5 a $PMW_R$ or $PWM_L$ control signal of PWM type; consequently, the time instant $t1_{out\_N}$ and $t2_{out\_N}$ is the moment in which, during the control cycle N, the processing core 14 or 15 sends the $PMW_R$ or $PWM_L$ control signal of PWM type to the respective electronic power converter 5.

In summary, the focus of the synchrony control carried out by the processing core 13, provided that the aforementioned preconditions are satisfied, is limited to interactively ensuring and monitoring the time values $t1_{acq\_N}$ and $t2_{acq\_N}$ of acquisition by the processing cores 14 and 15 of the torque or speed targets $T_{TRG\_R}$ and $T_{TRG\_L}$ to be implemented in the respective electric motors 4, and to interactively ensuring and monitoring the time values $t1_{out\_N}$ and $t2_{out\_N}$ of transmission of the $PMW_R$ and $PWM_L$ control signals of PWM type to the respective electronic power converters 5. In the event of unexpected behaviour due to a malfunction (software error or random hardware failure) which leads to a potential violation of the safety goal, the safe state must be implemented; the use of a single platform (i.e. of a single multi-core microprocessor 9) ensures that the activation of the safe state is synchronous in the two electric motors 4, preventing the potential destabilization of the vehicle 1 and the loss of control should only one of the two electric motors 4 be turned off.

According to a preferred embodiment, in the event of unexpected behaviour due to a malfunction (systematic software error or random hardware failure) which leads to a potential violation of the safety goal (i.e. in the event of loss of the synchrony detected by the non-compliance with one or both of the equations [1] and [2] described above), the processing core 13 activates the emergency recovery procedure taking direct control of the electronic power converters 5 (i.e. of the electric motors 4) bypassing (overwriting) the outputs of the two processing cores 14 and 15 (which are thus "invalidated", i.e. "overwritten"). Obviously, when in the event of emergency the processing core 13 takes direct control of the electronic power converters 5, the processing core 13 uses an emergency control strategy which is simplified with respect to the standard control strategy and ensures the perfect synchrony between the two electronic power converters 5 (being a single processing core 13 which controls the two electronic power converters 5 together, the perfect synchrony is always ensured). It is important to note that the surveillance device 18 which integrates a surveillance entity implements a redundant control of the multi-core microprocessor 9 and that its presence is thus not strictly necessary; consequently, there can be embodiments wherein the control system 8 has no surveillance device 18.

It is important to note that the control algorithms for controlling the two electronic power converters 5 implemented in the two processing cores 14 and 15 are designed to be at the exact same level of hierarchy (i.e. they are both slaves of the single master which is the processing core 13) and thus no control algorithm pursues a law of motion of the other control algorithm, but each control algorithm goes "its own way", taking no interest in what the other control algorithm is doing and following only the directions of the processing core 13. Consequently, the two processing cores 14 and 15 do not exchange information with one another for reciprocal synchronization, i.e. information for making a law of motion of one electric motor 4 follow the law of motion of the other electric motor 4, since the two electric motors 4 are controlled in an entirely independent manner and not directly synchronized with one another (the synchronization of the commands is obtained through the control architecture and is constantly checked by the processing core 13 and is not obtained by means of a synchronization signal exchanged between the two processing cores 14 and 15). The absence of a synchronization signal exchanged between the two processing cores 14 and 15 allows making the control more rapid since it reduces latency.

In the embodiment illustrated in the attached figures, the control system 8 is used in a car equipped with four wheels. According to other perfectly equivalent embodiments, the control system 8 is used in any type of vehicle (road or off-road) equipped with at least two driving wheels 2 actuated by two electric motors 4 mechanically independent from one another; for example, the control system 8 can be used: in a motor vehicle (wherein both the front wheel and the rear wheel are driving wheels and are actuated by two electric motors 4 mechanically independent from one another), in a van, in a truck, in a bus, in an earth-moving vehicle, in an agricultural vehicle (outside the automotive sector, including trucks and buses or the motorcycle sector, the ISO standard of reference may be different from the standard ISO26262 mentioned in the foregoing).

In the embodiment illustrated in the attached figures, a control system 8 controls two electric motors 4; according to other embodiments not illustrated, a control system 8 controls more than two electric motors 4.

Summarizing what presented above, the control system 8 is based on four fundamental points:
1. The use of a single multi-core platform (the multi-core microprocessor 9) based on a master-slave control architecture (wherein the processing core 13 acts as master in order to dictate the execution timing of the tasks to the two processing cores 14 and 15, which act as slaves).
2. Each control function (for each wheel controlled by each processing core 14 and 15) is developed in accordance with the standard ISO26262 in order to ensure consistency with the safety goal and the relative allocated ASIL; in particular, the ASIL decomposition technique can be applied between the slave processing cores 14 and 15 dedicated to controlling the electric motors 4 and the master processing core 13 in order to reduce the complexity.
3. The implementation of an interactive monitoring functionality developed in accordance with the standard ISO26262 according to the relative ASIL allocated to the functionality;
4. The existence of a principle of overlap of the effects between the control functionality on each single slave processing core 14 and 15 and the interactive monitoring performed by the master processing core 13.

The embodiments described herein can be combined between one another without departing from the protection scope of the present invention.

The control system 8 described above has numerous advantages as it allows carrying out an advanced interactive monitoring and a synchronization strategy of electric motors 4 simplified and compliant with the functional safety strategies on multi-core platforms in multi-motor applications for electrically driven vehicles.

First of all, the control system 8 described above allows ensuring the safety of the road vehicle 1 in every situation, as it ensures that, also in the case of errors in the control of the two electric motors 4 of a same electric axle 2, the two electric motors 4 always have a coherent behaviour; i.e. if unfortunately a control error is present, then the two electric motors 4 of a same electric axle 2 are controlled for attaining the safe state in a coherent manner by means of the processing core 13. The coherent behaviour of the two electric motors 4 of a same electric axle 2 ensures that the vehicle 1 is never subjected to excessive yawing moments (generated by differences between the right side and the left side) which could cause the vehicle 1 to lose control causing potentially very dangerous spins.

The control system 8 described above allows a significant simplification of the system architecture with consequent gain in terms of physical space with respect to the state of the art (given the presence of a single platform equipped with multi-core microprocessor 9); the described control system 8 further allows predictability of the synchronization times.

The control system 8 described above ensures a high functional performance and a reduced implementation time thanks to the use of a single multi-core microprocessor 9.

The control system 8 described above integrates the functional safety required by the standard ISO26262.

The control system 8 ensures a high predictability of the time synchronization.

The control system 8 described above has a high intrinsic safety, as the various tasks are divided between a plurality of processing cores 13-15 which are functionally entirely independent of one another and thus capable of operating also if one of them manifests problems, unless there are common causes of failure (i.e. dependent failures) managed, though, also by the external surveillance entity. Moreover, in the event of malfunctions that the multi-core microprocessor 9 is unable to manage autonomously (for example, a malfunction of the processing core 13), the surveillance device 18 which integrates the surveillance entity is capable of intervening in an autonomous and independent manner from the multi-core microprocessor 9 and of leading the system to the safe state.

The control system 8 described above has a high speed in communicating the control information, since all the processing cores 13-15 that exchange information with one another are all part of a same multi-core microprocessor 9.

Finally, the control system 8 described above is relatively simple and cost-effective to produce using a single multi-core microprocessor 9 capable of managing a plurality of actuations on different electric motors 4 (actuators); i.e. the control system 8 described above uses the multi-core microprocessors currently available on the market in abundance and at reasonable prices for managing multiple and synchronous actuations on a plurality of different electric motors 4 (actuators).

LIST OF THE REFERENCE NUMERALS OF THE FIGURES

1 vehicle
2 electric axle
3 driving wheels
4 electric motors
5 electronic power converter
6 storage device
7 storage device
8 control system
9 multi-core microprocessor
10 BUS network
11 vehicle control unit
12 voltage regulator
13 processing core
14 processing core
15 processing core
16 position sensor
17 current sensor
18 surveillance device

The invention claimed is:

1. A control system (8) to control at least two electric motors (4) driving a vehicle (1); the control system (8) comprises:
a first processing core (14), which is configured to, in a control cycle N and for a first electric motor (4), determine a first electric current target ($I_{TRG\_R}$) based on a first torque or speed target ($T_{TRG\_R}$) and, hence, control a first electronic power converter (5) connected to the first electric motor (4) so as to pursue the first electric current target ($I_{TRG\_R}$);
a second processing core (15), which is configured to, in the control cycle N and for a second electric motor (4), determine a second electric current target ($I_{TRG\_L}$) based on a second torque or speed target ($T_{TRG\_L}$) and, hence, control a second electronic power converter (5) connected to the second electric motor (4) so as to pursue the second electric current target ($I_{TRG\_L}$); and
a third processing core (13) operating as master, which is configured to acquire the first and the second torque or speed target ($T_{TRG\_R}$, $T_{TRG\_L}$) and, hence, transmit in a synchronized manner the first and the second torque or speed target ($T_{TRG\_R}$, $T_{TRG\_L}$) to the first and to the second processing core (14, 15) operating as slaves;
the control system (8) is characterized in that:
the three processing cores (13, 14, 15) are all part of a same and single multi-core microprocessor (9) which uses a single clock signal which is thus common to all three processing cores (13, 14, 15);
the third processing core (13) is configured to carry out a monitoring operation in the first and in the second processing core (14, 15); and
the third processing core (13) is configured to check whether inputs of the first and of the second processing core (14, 15) from the third processing core (13) are synchronized with one another, to check whether outputs of the first and of the second processing core (14, 15) to the first and second electronic power converters (5) are synchronized with one another, and to carry out, if the inputs and/or the outputs of the first and of the second processing core (14, 15) are not synchronized with one another, an emergency recovery procedure wherein the third processing core (13) takes direct control of the electronic power converters (5), bypassing the outputs of the first and of the second processing core (14, 15).

2. The control system (8) according to claim 1, wherein the third processing core (13) is configured to check for the presence of operation in the first and in the second processing core (14, 15) and for the correct synchronization between the first and the second processing core (14, 15).

3. The control system (8) according to claim 1, wherein:
wherein the first processing core (14) and the second processing core (15) are both slave devices of a single master which comprises the third processing core (13).

4. The control system (8) according to claim 1, wherein control algorithms of the two electronic power converters (5) implemented in the first and in the second processing core (14, 15) are designed to be at the exact same level of hierarchy.

5. The control system (8) according to claim 4, wherein the control algorithms of the two electronic power converters (5) implemented in the first and in the second processing core (14, 15) are designed to implement a control according to the requirements of the ISO26262 standard.

6. The control system (8) according to claim 1, wherein the third processing core (13) acquires the first and the second torque or speed target ($T_{TRG\_R}$, $T_{TRG\_L}$) from a bus network (10) of the vehicle (1).

7. The control system (8) according to claim 1, wherein the first electric motor (4) and the second electric motor (4) are independently controlled and are not directly synchronized with one another.

8. The control system (8) according to claim 7, wherein:
the inputs of the first and of the second processing core (14, 15) are the respective torque or speed targets ($T_{TRG\_R}$, $T_{TRG\_L}$); and
the outputs of the first and of the second processing core (14, 15) are commands for the respective electronic power converters (5).

9. The control system (8) according to claim 1, wherein the third processing core (13) is configured to:
check whether the first and the second processing core (14, 15) acquire the respective torque or speed targets ($T_{TRG\_R}$, $T_{TRG\_L}$) in a synchronized manner; and
activate the emergency recovery procedure if the first and the second processing core (14, 15) do not acquire the respective torque or speed targets ($T_{TRG\_R}$, $T_{TRG\_L}$) in a synchronized manner.

10. The control system (8) according to claim 9, wherein the check for an acquisition synchronization is carried out by checking the following equation:

$$|t1_{acq\_N} - t2_{acq\_N}| < TH_1 \quad [1]$$

$t1_{acq\_N}$ time instant in which the first processing core (14) acquires the first torque or speed target ($T_{TRG\_R}$) during the control cycle N;

$t2_{acq\_N}$ time instant in which the second processing core (15) acquires the second torque or speed target ($T_{TRG\_L}$) during the control cycle N;

$TH_1$ first threshold value defined as safe.

11. The control system (8) according to claim 1, wherein the third processing core (13) is configured to:
   check whether the first and the second processing core (14, 15) control the respective electronic power converters (5) in a synchronized manner; and
   activate the emergency recovery procedure if the first and the second processing core (14, 15) do not control the respective electronic power converters (5) in a synchronized manner.

12. The control system (8) according to claim 11, wherein the check for a control synchronization is carried out by checking the following equation:

$$|t1_{out\_N} - t2_{out\_N}| < TH_2 \quad [2]$$

$t1_{out\_N}$ time instant in which the first processing core (14) controls the first electronic power converter (5) during the control cycle N;

$t2_{out\_N}$ time instant in which the second processing core (15) controls the second electronic power converter (5) during the control cycle N;

$TH_2$ second threshold value defined as safe.

13. The control system (8) according to claim 12, wherein:
   each first or second processing core (14, 15) controls the respective electronic power converter (5) by sending a PWM control signal ($PMW_R$, $PWM_L$) to the electronic power converter (5); and
   the time instant ($t1_{out\_N}$, $t2_{out\_N}$) in which each first or second processing core (14, 15) controls the electronic power converter (5) is the moment in which the first or second processing core (14, 15) sends the PWM control signal ($PMW_R$, $PWM_L$) to the respective electronic power converter (5).

14. The control system (8) according to claim 1 and comprising a surveillance device (18), which is on the outside of and is independent of the multi-core microprocessor (9) and is configured to cyclically check for operation in the multi-core microprocessor (9) and to directly turn off the electronic power converters (5), completely independently of the multi-core microprocessor (9), in case of fault of the multi-core microprocessor (9).

15. A control method to control at least two electric motors (4) driving a vehicle (1); the control method comprises the steps of:
   determining, in a control cycle N and by means of a first processing core (14), for a first electric motor (4), a first electric current target ($I_{TRG\_R}$) based on a first torque target ($T_{TRG\_R}$);
   determining, in the control cycle N and by means of a second processing core (15), for a second electric motor (4), a second electric current target ($I_{TRG\_L}$) based on a second torque or speed target ($T_{TRG\_L}$);
   controlling, in the control cycle N and by means of the first processing core (14), a first electronic power converter (5) connected to the first electric motor (4) so as to pursue the first electric current target ($I_{TRG\_R}$);
   controlling, in the control cycle N and by means of the second processing core (15), a second electronic power converter (5) connected to the second electric motor (4) so as to pursue the second electric current target ($I_{TRG\_L}$);
   having a third processing core (13) operating as master acquire the first and the second torque target ($T_{TRG\_R}$, $T_{TRG\_L}$);
   transmitting the first and the second torque or speed target ($T_{TRG\_R}$, $T_{TRG\_L}$) from the third processing core (13) operating as master to the first and the second slave processing core (14, 15) operating as slaves in a synchronized manner;
   the control method is characterized in that it comprises the further steps of:
   carrying out, by means of the third processing core (13), a monitoring operation in the first and in the second processing core (14, 15);
   checking, by means of the third processing core (13), that inputs of the first and of the second processing core (14, 15) from the third processing core (13) are synchronized with one another and that outputs of the first and of the second processing core (14, 15) to the first and second electronic power converters (5) are synchronized with one another; and
   carrying out, by means of the third processing core (13) and when the inputs and/or the outputs of the first and of the second processing core (14, 15) are not synchronized with one another, an emergency recovery procedure wherein the third processing core (13) takes direct control of the electronic power converters (5) bypassing the outputs of the first and of the second processing core (14, 15);
   wherein the three processing cores (13, 14, 15) are all part of a same and single multi-core microprocessor (9) which uses a single clock signal which, hence, is common to all three processing cores (13, 14, 15).

* * * * *